(12) United States Patent
Lam et al.

(10) Patent No.: US 8,374,453 B2
(45) Date of Patent: Feb. 12, 2013

(54) INTEGRATING IMAGE FRAMES

(75) Inventors: Eric P. Lam, Diamond Bar, CA (US); Christopher A. Leddy, Huntington Beach, CA (US); Stephen R. Nash, Playa Del Rey, CA (US); Harrison A. Parks, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/943,467

(22) Filed: Nov. 10, 2010

(65) Prior Publication Data
US 2012/0114235 A1 May 10, 2012

(51) Int. Cl.
G06K 9/40 (2006.01)
(52) U.S. Cl. .......................................... 382/254
(58) Field of Classification Search .................. None
See application file for complete search history.

(56) References Cited

U.S. PATENT DOCUMENTS

| | | | |
|---|---|---|---|
| 5,126,849 A | 6/1992 | Senuma et al. | |
| 5,909,026 A | 6/1999 | Zhou et al. | |
| 7,013,021 B2 * | 3/2006 | Sharma et al. | 382/100 |
| 7,187,405 B2 | 3/2007 | Poplin et al. | |
| 7,280,161 B2 * | 10/2007 | Satou et al. | 348/701 |
| 7,394,939 B2 | 7/2008 | Abrams, Jr. et al. | |
| 7,460,178 B2 | 12/2008 | Kondo et al. | |
| 7,515,747 B2 * | 4/2009 | Okutomi et al. | 382/167 |
| 7,522,756 B2 | 4/2009 | Bueno et al. | |
| 7,561,736 B2 | 7/2009 | Itokawa | |
| 7,596,177 B2 | 9/2009 | Imagawa et al. | |
| 7,672,378 B2 * | 3/2010 | Ng et al. | 375/240.26 |
| 7,907,183 B2 * | 3/2011 | Imagawa et al. | 348/220.1 |
| 2003/0081854 A1 * | 5/2003 | Deshpande | 382/261 |
| 2003/0227545 A1 * | 12/2003 | Soya et al. | 348/143 |
| 2005/0122433 A1 * | 6/2005 | Satou et al. | 348/701 |
| 2005/0219642 A1 * | 10/2005 | Yachida et al. | 358/448 |
| 2006/0038891 A1 * | 2/2006 | Okutomi et al. | 348/222.1 |
| 2007/0189386 A1 * | 8/2007 | Imagawa et al. | 375/240.12 |
| 2008/0211968 A1 * | 9/2008 | Murakami et al. | 348/699 |
| 2008/0259176 A1 | 10/2008 | Tamaru | |
| 2009/0237516 A1 | 9/2009 | Jayachandra et al. | |
| 2009/0263044 A1 * | 10/2009 | Imagawa et al. | 382/275 |
| 2010/0157079 A1 | 6/2010 | Atanassov et al. | |
| 2010/0157110 A1 | 6/2010 | Hatanaka et al. | |

OTHER PUBLICATIONS

Lam et al.; An Image Sharpness Metric for Image Processing Applications Using Feedback; Proc. SPIE; vol. 6543, 654301; 2007.

* cited by examiner

*Primary Examiner* — Samir Ahmed
(74) *Attorney, Agent, or Firm* — Pierce Atwood LLP; Joseph M. Maraia

(57) ABSTRACT

The technology described herein includes integration of image frames. The integration of image frames includes determining a sharpness metric for each image frame in a plurality of image frames. The sharpness metric is indicative of at least one of edge content and an edge size of the image frame. The integration of image frames further includes determining a noise metric for each image frame in the plurality of image frames. The noise metric is indicative of a variation in brightness or color in the image frame. The integration of image frames further includes determining a jitter metric for each image frame in the plurality of image frames. The jitter metric is indicative of spatial shifts between the image frame and other image frames in the plurality of image frames. The integration of image frames further includes generating an integrated image frame from one or more of the plurality of image frames based on the sharpness metric, the noise metric, and the jitter metric.

8 Claims, 10 Drawing Sheets

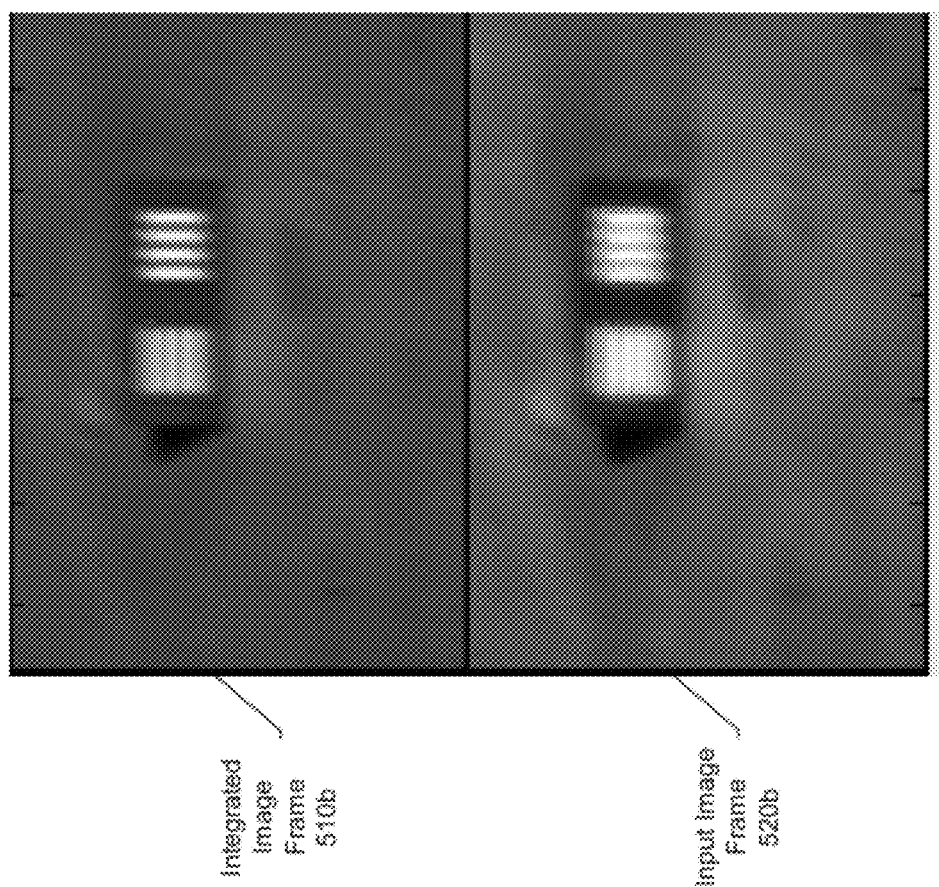

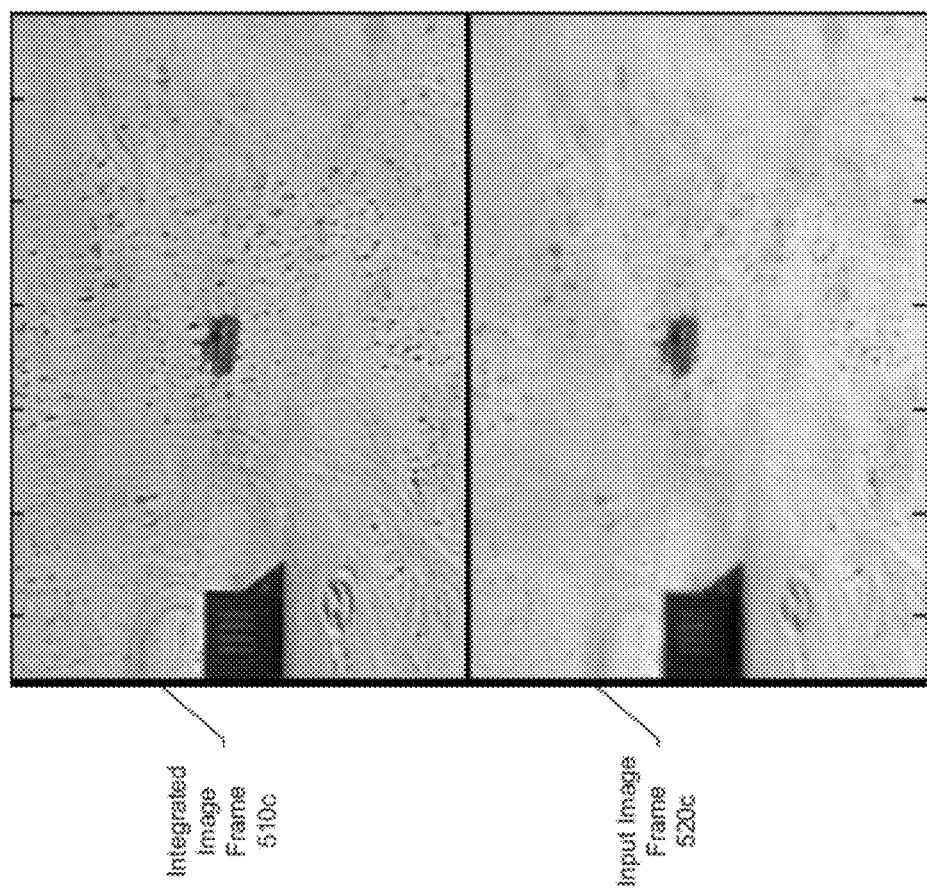

INTEGRATING IMAGE FRAMES

BACKGROUND

Generally, the display of images is degraded by motion blur and noise. Prior attempts at image frame integration reduce noise and increase sensor performance. However, the prior attempts at image frame integration are often degraded by motion blur and noise. Thus, a need exists in the art for improved image frame integration.

SUMMARY

One approach to integrating image frames is a system. The system includes an image sharpness module, an image noise module, an image jitter module, and an image integration module. The image sharpness module determines a sharpness metric for each image frame in a plurality of image frames. The sharpness metric is indicative of at least one of edge content and an edge size of the image frame. The image noise module determines a noise metric for each image frame in the plurality of image frames. The noise metric is indicative of random variations in brightness or color in the image frame. The image jitter module determines a jitter metric for each image frame in the plurality of image frames. The jitter metric is indicative of spatial shifts between the image frame and other image frames in the plurality of image frames. The image integration module generates an integrated image frame from one or more of the plurality of image frames based on the sharpness metric, the noise metric, and the jitter metric.

Another approach to integrating image frames is a method. The method includes determining a sharpness metric for each image frame in a plurality of image frames. The sharpness metric is indicative of at least one of edge content and an edge size of the image frame. The method further includes determining a noise metric for each image frame in the plurality of image frames. The noise metric is indicative of random variations in brightness or color in the image frame. The method further includes determining a jitter metric for each image frame in the plurality of image frames. The jitter metric is indicative of spatial shifts between the image frame and other image frames in the plurality of image frames. The method further includes generating an integrated image frame from one or more of the plurality of image frames based on the sharpness metric, the noise metric, and the jitter metric.

Another approach to integrating image frames is a computer program product. The computer program product is tangibly embodied in an information carrier. The computer program product including instructions being operable to cause a data processing apparatus to determine a sharpness metric for each image frame in a plurality of image frames, the sharpness metric being indicative of at least one of edge content and an edge size of the image frame; determine a noise metric for each image frame in the plurality of image frames, the noise metric being indicative of random variations in brightness or color in the image frame; determine a jitter metric for each image frame in the plurality of image frames, the jitter metric being indicative of spatial shifts between the image frame and other image frames in the plurality of image frames; and generate an integrated image frame from one or more of the plurality of image frames based on the sharpness metric, the noise metric, and the jitter metric.

In other examples, any of the approaches above can include one or more of the following features.

In some examples, the image sharpness module separates one or more horizontal edge components and one or more vertical edge components in each image frame in the plurality of image frames; interpolates the one or more horizontal components and the one or more vertical components for each image frame in the plurality of image frames; and correlates the interpolated horizontal and vertical components to determine a pixel shift for each image frame in the plurality of image frames, the pixel shift being indicative of at least one of the edge content and the edge size of the respective image frame.

In other examples, the image sharpness module generates an edge map for each image frame in the plurality of image frames. The edge map includes pixel values indicative of an edge and a non-edge. In some examples, the image sharpness module combines the pixel values in the edge map for each image frame in the plurality of image frames to form the sharpness metric.

In other examples, the image integration module selects the one or more of the plurality of image frames from the plurality of image frames based on the sharpness metric, the noise metric, and the jitter metric.

In some examples, the image integration module prioritizes the one or more of the plurality of image frames from the plurality of image frames based on the sharpness metric, the noise metric, and the jitter metric for the generation of the integrated image frame.

In other examples, determining the sharpness metric includes separating one or more horizontal edge components and one or more vertical edge components in each image frame in the plurality of image frames; interpolating the one or more horizontal components and the one or more vertical components for each image frame in the plurality of image frames; and correlating the interpolated horizontal and vertical components to determine a pixel shift for each image frame in the plurality of image frames. The pixel shift is indicative of at least one of the edge content and the edge size of the respective image frame.

In some examples, determining the sharpness metric includes generating an edge map for each image frame in the plurality of image frames. The edge map includes pixel values indicative of an edge and a non-edge. In other examples, determining the sharpness metric includes combining the pixel values in the edge map for each image frame in the plurality of image frames to form the sharpness metric.

In some examples, combining the pixel values in the edge map includes summing the pixel values in the edge map for each image frame in the plurality of image frames to form the sharpness metric.

In other examples, the method further includes selecting the one or more of the plurality of image frames from the plurality of image frames based on the sharpness metric, the noise metric, and the jitter metric.

In some examples, the method further includes prioritizing the one or more of the plurality of image frames from the plurality of image frames based on the sharpness metric, the noise metric, and the jitter metric for the generation of the integrated image frame.

The image frame integration techniques described herein can provide one or more of the following advantages. An advantage to the image frame integration is focused enhancement of the resolution for viewing and/or processing of the image, thereby increasing the efficiency of the image capture and recognition process and reducing the need for re-taking images of the same object. Another advantage to the image frame integration is the combination of the jitter metric, the noise metric, and the sharpness metric provides for a synergistic enhancement of the integrated image, thereby increasing the efficiency of the image system and decreasing the performance requirements on other aspects of the image system such as optical resolution and stabilization. Another advantage to the image frame integration is the selective integration of image frames based on the quality of the image frame (e.g., sharpness, noise, jitter, etc.), which decreases integration when an image frame is degraded, thereby decreasing the impact of degraded image frames and improving performance of the presented output video.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIGS. 5A-5C depict exemplary input image frames and integrated image frames;

DETAILED DESCRIPTION

The image frame integration method and apparatus includes technology that, generally, integrates image frames based on sharpness (e.g., thickness of image frame edges), noise (e.g., brightness or color in the image frame), and/or jitter (e.g., spatial shifts between image frames) of each of the individual image frames. The technology minimizes the undesirable effects of frame integration by increasing the integration when the sharpness level is high enough to show sufficient gain over the potential degradations and by decreasing the integration when the input frames show motion blurring (i.e., the sharpness metric decreases). The technology advantageously uses the sharpness, noise, and jitter to provide maximum performance while minimizing the degrading effects of image frame integration, thereby providing a better resolution of the image to maximum the efficiency of the image processing (e.g., for object detection, for object viewing, etc.). The technology can advantageously be utilized for electronic stabilization including, but not limited to oversampled video presentation, spatially enhanced zoom, contrast enhancement, noise enhancement, improved frequency response, real-time video presentation with minimal lag, and/or any other type of video/image enhancement.

The technology utilizes a sharpness characteristic and/or a blur characteristic (the opposite of the sharpness characteristic) of the image frames to maximize the overall performance of the integration of the image frames. The technology measures sharpness (or blurriness) of an image frame and integrates the image frame based on this sharpness information. For example, if an image frame is too blurred, the image frame is integrated such that the image frame does not affect the final integrated image frame as much. In other words, the technology can prioritize the integration of various image frames based on the image frames sharpness.

Figure 1:
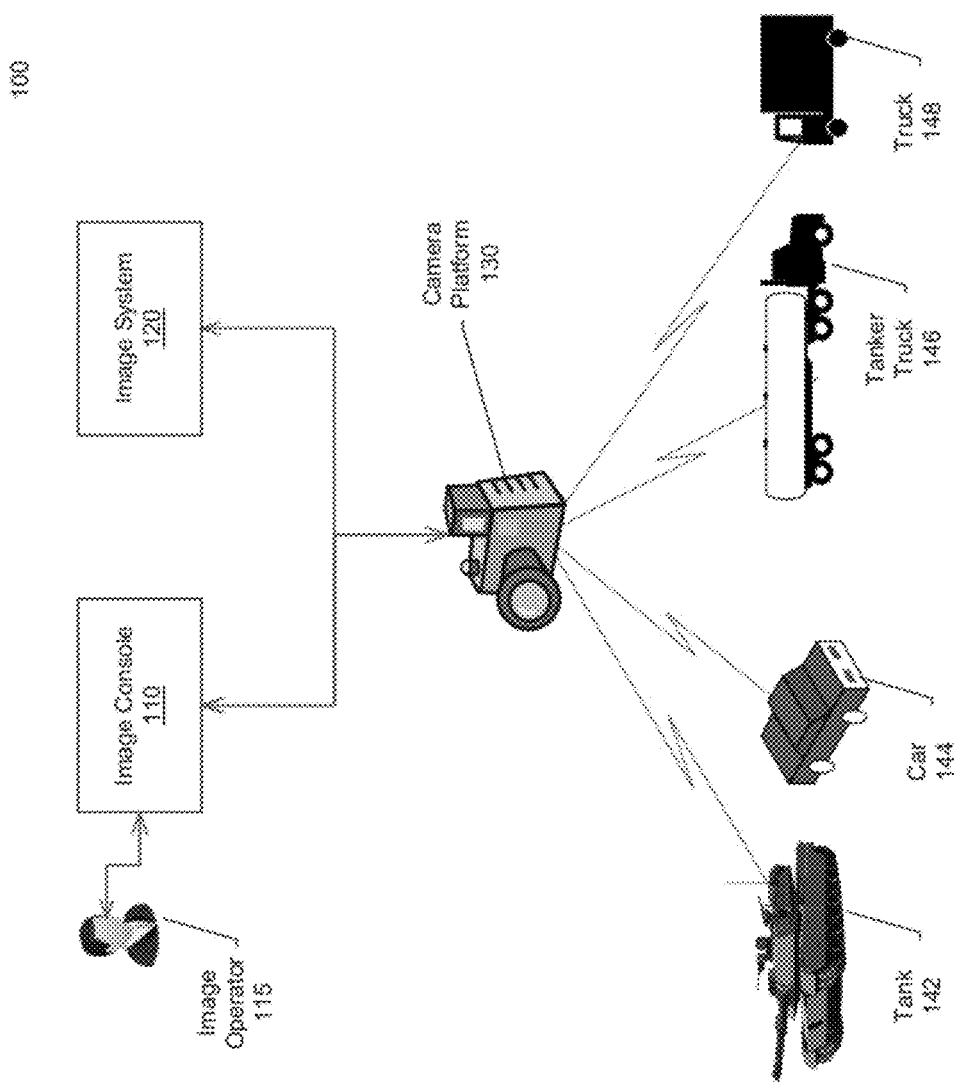
FIG. 1 is a diagram of an exemplary image acquisition environment.

FIG. 1 is a diagram of an exemplary image acquisition environment 100. The environment 100 includes an image console 110, an image system 120, and a camera platform 130. An image operator 115 views a plurality of objects utilizing the image console 110. The plurality of objects includes a tank 132, a car 134, a tanker trailer 136, and a truck 138. The camera platform 130 (e.g., optical camera platform, infrared camera platform, etc.) receives optical waves, infrared waves, and/or any other type of waveform to form an image of one or more of the plurality of objects. The camera platform 130 communicates data (e.g., digital representation of an image of the tank 132, optical representation of an image of the car 134, etc.) to the image system 120.

The image system 120 analyzes the received video and/or image frames to integrate the image frames (e.g., a single snapshot of the image at a specified time, a sub-part of the image, etc.). For example, a one second video of an object includes ten image frames of the object. In this example, the image system 120 integrates the ten image frames to form an integrated image frame with enhanced resolution of the object. The image system 120 can store the integrated image for further analysis and/or transmit the integrated image to the image console 110 for viewing and/or analysis by the image operator 115.

Although FIG. 1 illustrates a single camera platform 130, the environment 100 can utilize any number of camera platforms (e.g., ten camera platforms, one hundred camera platforms, etc.). For example, the image system 120 can receive images from any number of camera platforms for the same object or different objects (as illustrated in Table 1). In other examples, the single camera platform 130 can include a plurality of cameras and/or other types of image capture devices (e.g., motion sensor, environmental sensor, heat sensor, etc.).

Table 1 illustrates exemplary image information received by a plurality of camera platforms and transmitted to the image system 120.

TABLE 1

Exemplary Image Information

| Image | Object | Camera | Time |
|---|---|---|---|
| A34 | Tank 142 | Airplane BZ | 03:32.21 |
| A35 | Tank 142 | Airplane BZ | 03:32.22 |
| B34 | Tank 142 | Border Wall RT | 03:32.22 |
| C56 | Tank 142 | Command Carrier GH | 03:32.21 |
| D32 | Tank 142 | Satellite CB | 03:32.20 |

Figure 2:
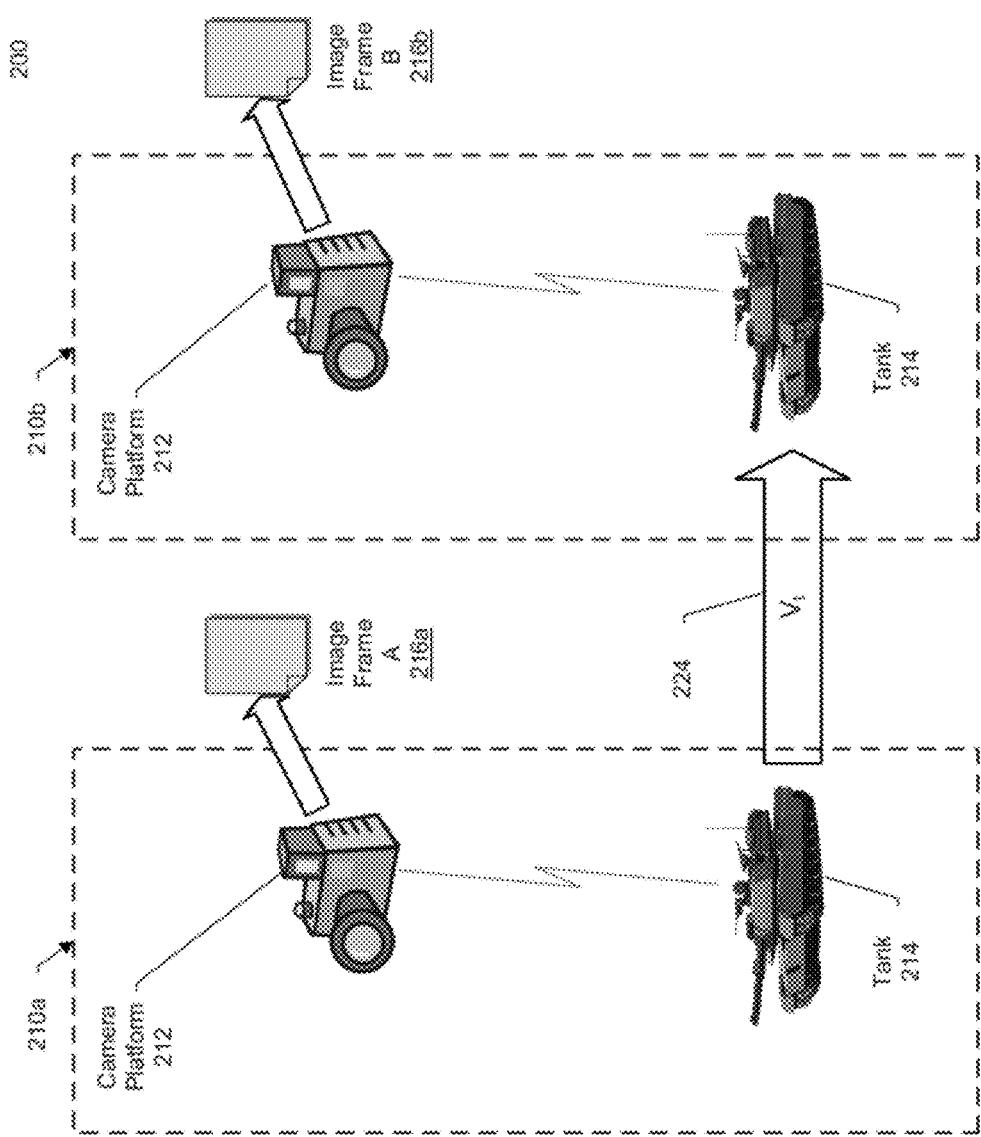
FIG. 2 is a diagram of another exemplary image acquisition environment.

FIG. 2 is a diagram of another exemplary image acquisition environment 200. The image acquisition environment 200 illustrates images at two time frames A 210a and B 210b. At time A 210a, a camera platform 212 and a tank 214 are at a first position (e.g., the physical location of the camera platform 212 is in square 3×4 and the physical location of the tank 214 is in square 3×8), and the camera platform 212 receives an image frame A 216a of the tank 214. At time B 210b, the camera platform 212 and the tank 214 are at a second position (e.g., the physical location of the camera platform 212 is in square 3×4 and the physical location of the tank 214 is in square 9×8), and the camera platform 212 receives an image frame B 216b of the tank 214. During the time period between time A 210a and time B 210b, the tank 214 moved from the first position to the second position at a velocity $V_t$ 224. The camera platform 212 can transmit the image frames A 216a and B 216*b* to an image system (not shown) for processing (e.g., integration of the image frames into an integrated image frame).

Table 2 illustrates exemplary image information received by the camera platform 212.

TABLE 2

Exemplary Image Information

| Image | Object | Camera | Time |
|---|---|---|---|
| Image Frame A 216a | Tank 214 | Camera Platform 212 | 05:32.21 (Time A 210a) |
| Image Frame B 216b | Tank 214 | Camera Platform 212 | 05:32.22 (Time B 210b) |
| Image Frame C | Tank 214 | Camera Platform 212 | 05:32.23 |
| Image Frame D | Tank 214 | Camera Platform 212 | 05:32.24 |

Figure 3:
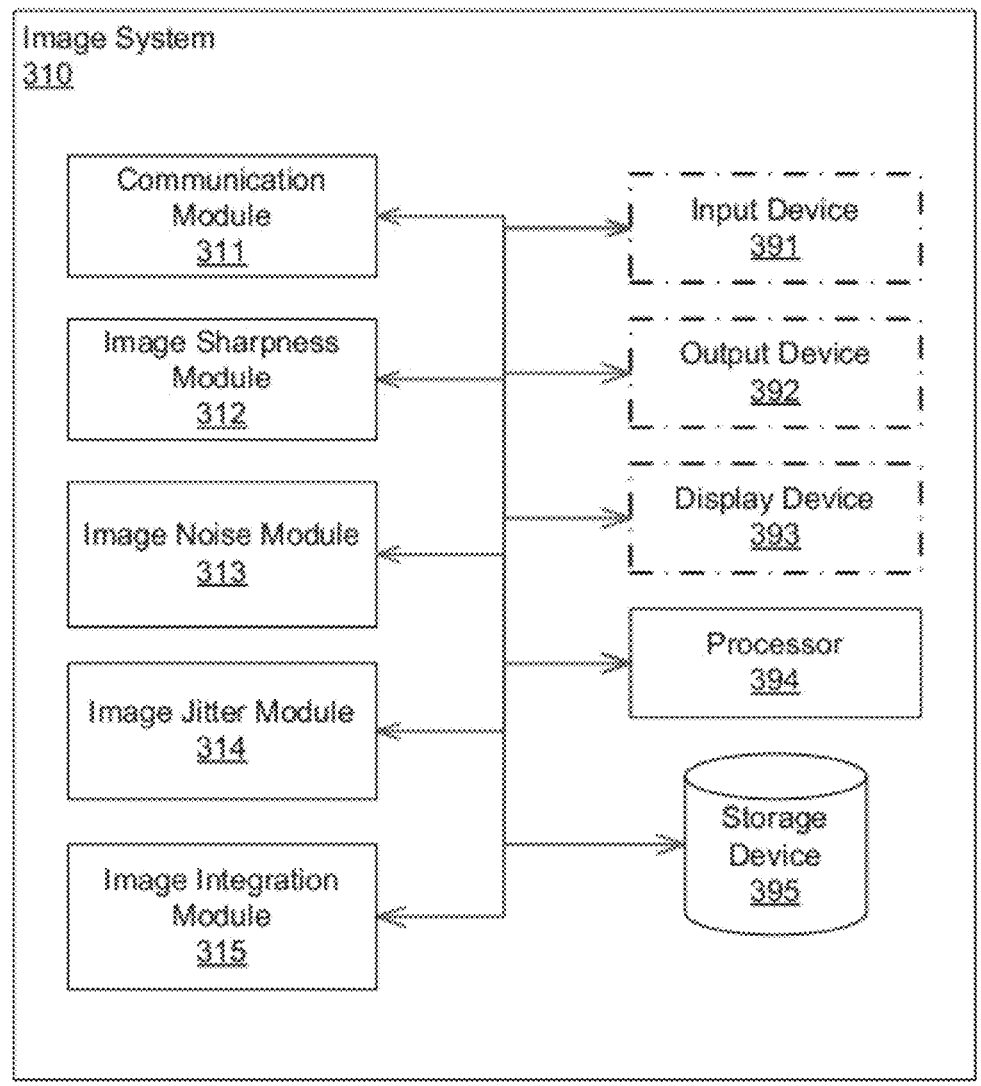
FIG. 3 is a block diagram of an exemplary image system.

FIG. 3 is a block diagram of an exemplary image system 310. The image system 310 includes a communication module 311, an image sharpness module 312, an image noise module 313, an image jitter module 314, an image integration module 315, an input device 391, an output device 392, a display device 393, a processor 394, and a storage device 395. The modules and devices described herein can, for example, utilize the processor 394 to execute computer executable instructions and/or include a processor to execute computer executable instructions (e.g., an encryption processing unit, a field programmable gate array processing unit, etc.). It should be understood that the image system 310 can include, for example, other modules, devices, and/or processors known in the art and/or varieties of the illustrated modules, devices, and/or processors.

The communication module 311 receives the images (e.g., from a camera platform, from an intermediate image processing device, from a storage device, etc.). The communication module 311 communicates information to/from the image system 310. The communication module 311 can receive, for example, information associated with a camera platform. The information associated with the camera platform can be associated with a data signal (e.g., data signal from a camera platform, processed data signal from a camera platform, data signal from a motion sensor, data signal from a global positioning system, data signal from a location system, etc.).

The image sharpness module 312 determines a sharpness metric for each image frame in a plurality of image frames. The sharpness metric is indicative of at least one of edge content and an edge size of the image frame.

In other examples, the image sharpness module 312 separates one or more horizontal edge components (e.g., a row within the image frame, set of rows within the image frame, etc.) and one or more vertical edge components (e.g., a column within the image frame, set of columns within the image frame, etc.) in each image frame in the plurality of image frames. In some examples, the image sharpness module 312 interpolate the one or more horizontal components and the one or more vertical components for each image frame in the plurality of image frames (e.g., to achieve sub-pixel alignment, to maximize sub-pixel alignment, etc.). In other examples, the image sharpness module 312 correlates the interpolated horizontal and vertical components to determine a pixel shift for each image frame in the plurality of image frames. The pixel shift is indicative of at least one of the edge content and the edge size (e.g., number of edges, size of edges, etc.) of the respective image frame. The pixel shift can be, for example, utilized by the image sharpness module 312 to generate an edge map for each image frame.

In some examples, the image sharpness module 312 generates an edge map for each image frame in the plurality of image frames. The edge map includes pixel values indicative of an edge and a non-edge. In other examples, the image sharpness module 312 combines the pixel values in the edge map for each image frame in the plurality of image frames to form the sharpness metric.

In other examples, the image sharpness module 312 utilizes an edge detector/extractor (e.g., Sobel detector, Canny edge extractor, etc.) to generate an edge map for the image frame. The edge map can, for example, include pixel values of one for edges and pixel values of zero for non-edges. The image sharpness module 312 can, for example, sum the pixel values to generate the sharpness metric for each image frame.

The image noise module 313 determines a noise metric for each image frame in the plurality of image frames. The noise metric is indicative of random variations in brightness or color in the image frame.

The image jitter module 314 determines a jitter metric for each image frame in the plurality of image frames. The jitter metric is indicative of spatial shifts between the image frame and other image frames in the plurality of image frames. The image jitter module 314 can, for example, utilize frame to frame registration to measure the spatial shifts between image frames due to unintended motion. The image jitter module 314 can, for example, utilize a Fitts algorithm, correlation, and/or any other type of jitter processing technique to determine the jitter metric. The image jitter module 314 can, for example, utilize a Kalman filter to measure the spatial shifts between image frames due to intended motion (e.g., image pan commands, image zoom commands, etc.).

The image integration module 315 generates an integrated image frame from one or more of the plurality of image frames based on the sharpness metric, the noise metric, and the jitter metric. In some examples, the image integration module 315 selects the one or more of the plurality of image frames from the plurality of image frames based on the sharpness metric, the noise metric, and the jitter metric. In other examples, the image integration module 315 prioritizes the one or more of the plurality of image frames from the plurality of image frames based on the sharpness metric, the noise metric, and the jitter metric for the generation of the integrated image frame.

In other examples, the image integration module 315 integrates the one or more image frames of the plurality of image frames by summing the respective pixels of each image frame. The image integration module 315 can, for example, perform a spatial shift between each image frame before the summing of the respective pixels of each image frame. In other words, if the object within the image frames has moved between the image frames, the image integration module 315 shifts the pixel summing based on the movement of the object within the image frames (e.g., shift of the object by twenty vertical pixels and forty horizontal pixels, shift of the object by two vertical pixels and one hundred horizontal pixels, etc.).

Table 3 illustrates exemplary summing of the respective pixels.

TABLE 3

Exemplary Summation of Respective Pixels

| Image Frame A | Value (R, G, B) | Image Frame B | Value (R, G, B) | Summation |
|---|---|---|---|---|
| Pixel 4 × 5 | 1, 4, 43 | Pixel 4 × 5 | 2, 4, 43 | 3, 8, 86 |
| Pixel 1 × 5 | 4, 4, 43 | Pixel 1 × 5 | 4, 4, 43 | 8, 8, 86 |

TABLE 3-continued

Exemplary Summation of Respective Pixels

| Image Frame A | Value (R, G, B) | Image Frame B | Value (R, G, B) | Summation |
|---|---|---|---|---|
| Pixel 3 × 5 | 1, 2, 43 | Pixel 3 × 5 | 2, 3, 43 | 3, 5, 86 |
| Pixel 4 × 4 | 1, 4, 40 | Pixel 4 × 4 | 2, 4, 43 | 3, 8, 83 |

In some examples, the image integration module 315 generates an integrated image frame from one or more of the plurality of image frames based on at least one of the sharpness metric, the noise metric, or the jitter metric. For example, the image integration module 315 generates an integrated image frame from one or more of the plurality of image frames based on the sharpness metric. As another example, the image integration module 315 generates an integrated image frame from one or more of the plurality of image frames based on the sharpness metric and the noise metric. In other examples, the image integration module 315 can utilize any known image integration techniques to integrate the image frames.

The input device 391 receives information associated with the image system 310 (e.g., instructions from a user, instructions from another computing device, etc.) from a user (not shown) and/or another computing system (not shown). The input device 391 can include, for example, a keyboard, a scanner, etc. The output device 392 outputs information associated with the image system 310 (e.g., information to a printer (not shown), information to a speaker, etc.).

The display device 393 displays information associated with the image system 310 (e.g., status information, configuration information, etc.). The processor 394 executes the operating system and/or any other computer executable instructions for the image system 310 (e.g., executes applications, etc.).

The storage device 395 stores the images (e.g., actual image, processed image, etc.), the integrated image frames, and/or any other data associated with the image system 310. The storage device 395 can store image information and/or any other data associated with the image system 310. The storage device 395 can include a plurality of storage devices and/or the image system 310 can include a plurality of storage devices (e.g., an image storage device, an integrated image storage device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 4:
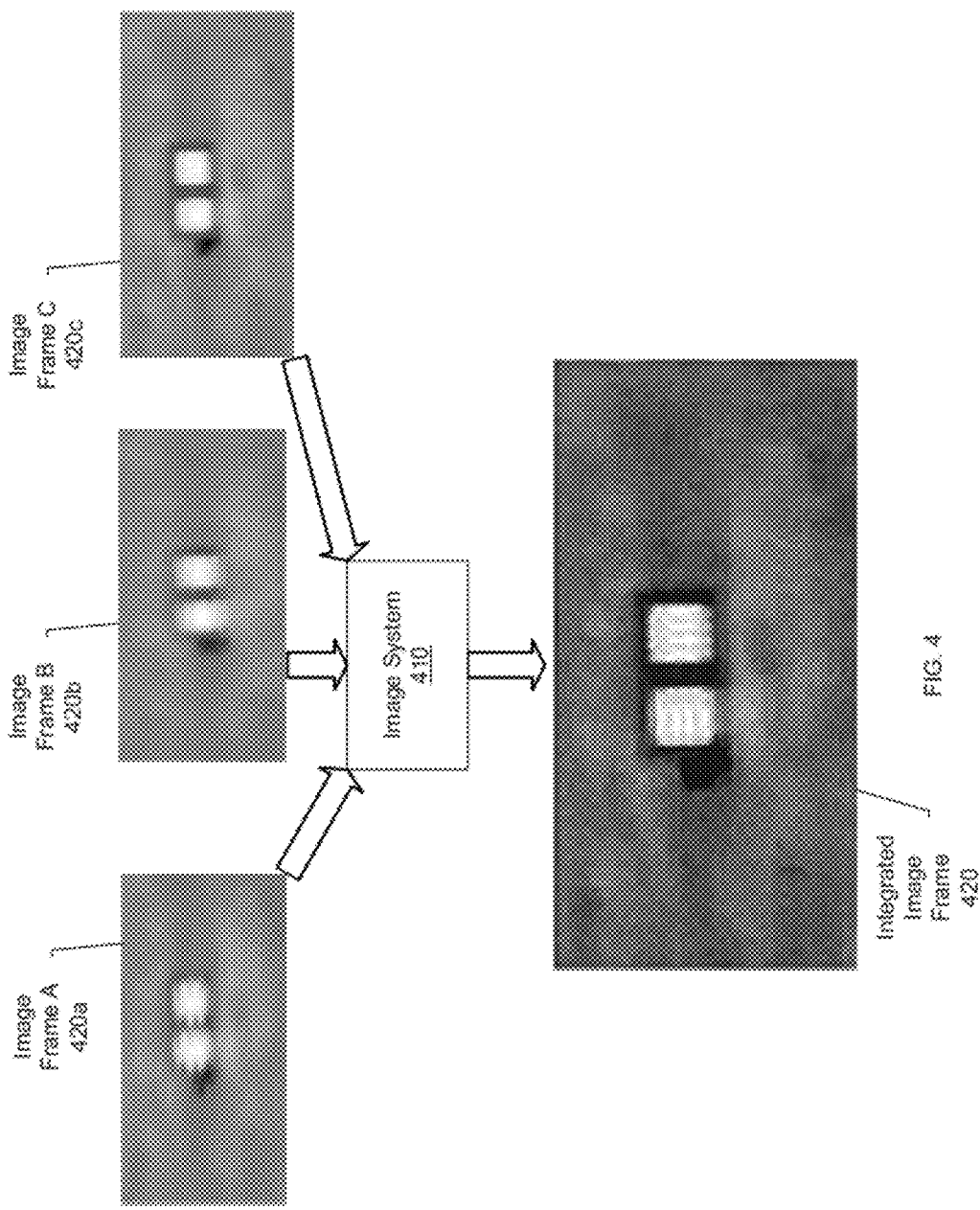
FIG. 4 depicts an exemplary integration of image frames into an integrated image frame.

FIG. 4 depicts an exemplary integration of image frames A 420a, B 420b, and C 420c into an integrated image frame 420. An image system 420 receives the image frames A 420a, B 420b, and C 420c. The image system 420 processes the image frames A 420a, B 420b, and C 420c (e.g., determines sharpness metric, determines noise metric, determines jitter metric, etc) and integrates the image frames A 420a, B 420b, and C 420c based on the processing to form the integrated image frame 420. As illustrated in FIG. 4, the integrated image frame 420 is advantageously sharper based on the synergetic integration of the image frames A 420a, B 420b, and C 420c.

Figure 5A:
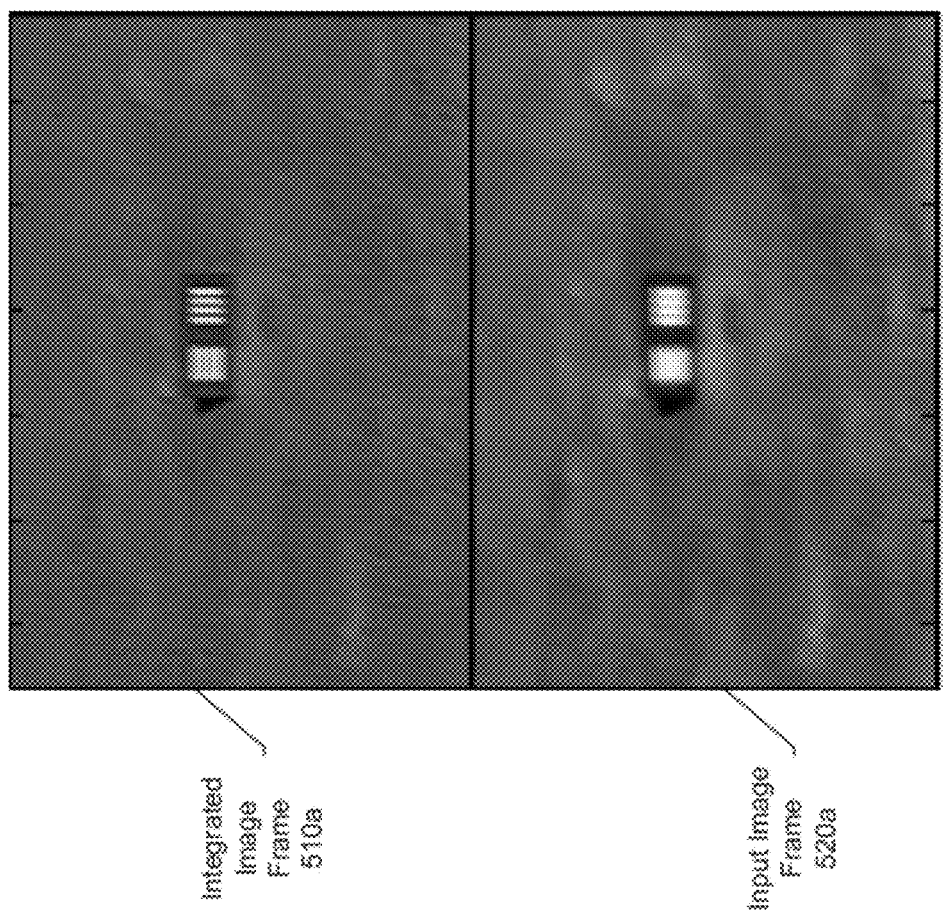

FIG. 5A depicts an exemplary input image frame 520a and an integrated image frame 510a. FIG. 5B depicts an exemplary input image frame 520b and an integrated image frame 510b. FIG. 5C depicts an exemplary input image frame 520c and an integrated image frame 510c. As illustrated in FIGS. 5A-5C, the integrated image frame 510a, 510b, and 510c have enhanced resolution for viewing and processing of the image frames.

Figure 6:
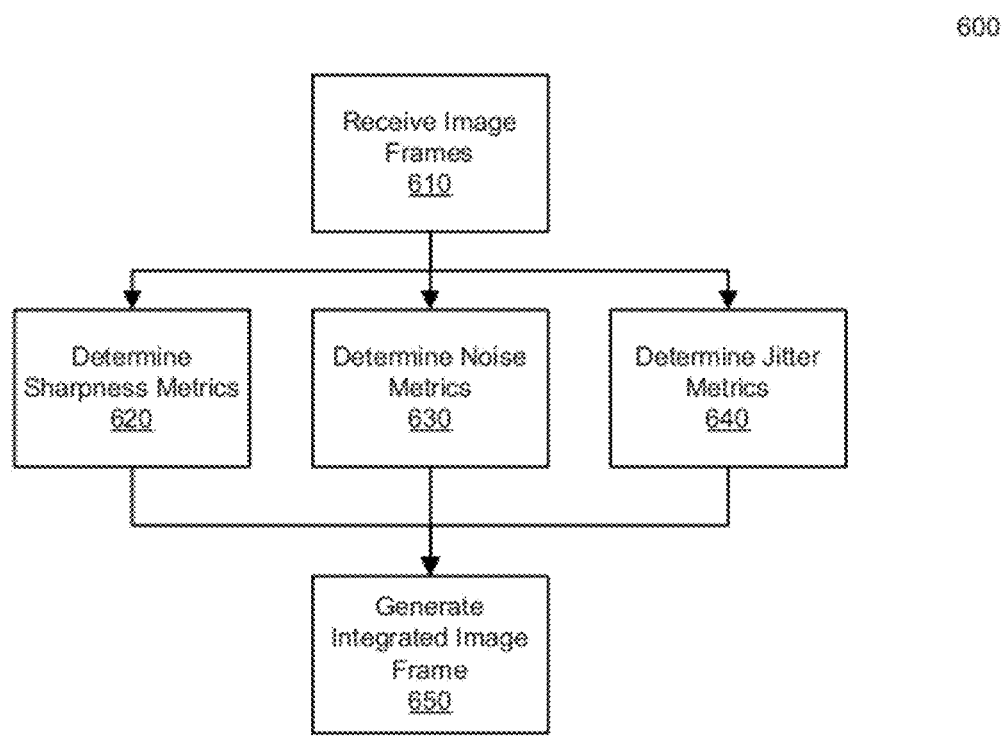
FIG. 6 is a flowchart of an exemplary image integration process.

FIG. 6 is a flowchart of an exemplary image integration process 600 utilizing, for example, the image system 310 of FIG. 3. The communication module 311 receives (610) a plurality of image frames (e.g., from a single camera platform, from a plurality of camera platforms, etc.). The image sharpness module 312 determines (620) a sharpness metric for each received image frame. The image noise module 313 determines (630) a noise metric for each received image frame. The image jitter module 314 determines (640) a jitter metric for each received image frame in the plurality of image frames. The image integration module 315 generates (650) an integrated image frame from one or more of the plurality of image frames based on the sharpness metric, the noise metric, and the jitter metric.

Table 4 illustrates exemplary metrics (scaled from 0-100) for image frames.

TABLE 4

Exemplary Metrics

| Image | Sharpness Metric | Noise Metric | Jitter Metric |
|---|---|---|---|
| Image Frame A 216a | 99 | 89 | 75 |
| Image Frame B 216b | 98 | 88 | 76 |
| Image Frame C | 98 | 86 | 82 |
| Image Frame D | 48 | 53 | 75 |

In other examples, the image integration module 315 prioritizes the one or more of the plurality of image frames from the plurality of image frames based on the sharpness metric, the noise metric, and the jitter metric for the generation of the integrated image frame. The prioritization can be, for example, an average of the metrics, a summation of the metrics, a weighting of the metrics (e.g., the sharpness metric is double weighted and the noise metric is half weighted, the jitter metric is triple weighted, etc.), and/or any other type of analysis of the metrics. Table 5 illustrates exemplary prioritization of the integration of image frames. In this example, the image frame A 216a is weighted greater than image frame D during the generation of the integrated image frame. In other examples, prioritization of the is weighted by a weighting factor (e.g., multiplied by the weighting factor, pre-determined weighting factor, etc.).

TABLE 5

Exemplary Prioritization of Image Frames

| Image | Sharpness Metric | Noise Metric | Jitter Metric | Prioritization (Average of Metrics) |
|---|---|---|---|---|
| Image Frame A 216a | 99 | 89 | 75 | 88 |
| Image Frame B 216b | 98 | 88 | 76 | 87 |
| Image Frame C | 98 | 86 | 82 | 89 |
| Image Frame D | 48 | 53 | 75 | 59 |

In some examples, the image integration module 315 selects the one or more of the plurality of image frames from the plurality of image frames based on the sharpness metric, the noise metric, and the jitter metric. The selection can be, for example, based on a pre-determined selection criteria (e.g., below a set threshold, above a set threshold, drop image frame with lowest metric, etc.) and/or dynamically determined criteria (e.g., above a metric average, below a metric mean, etc.). Table 6 illustrates exemplary selection of the image frames for integration.

TABLE 6

Exemplary Selection of Image Frames

| Image | Sharpness Metric | Noise Metric | Jitter Metric | Average of Metrics | Selection (Average >70) |
|---|---|---|---|---|---|
| Image Frame A 216a | 99 | 89 | 75 | 88 | Selected |
| Image Frame B 216b | 98 | 88 | 76 | 87 | Selected |
| Image Frame C | 98 | 86 | 82 | 89 | Selected |
| Image Frame D | 48 | 53 | 75 | 59 | Not Selected |

Figure 7:
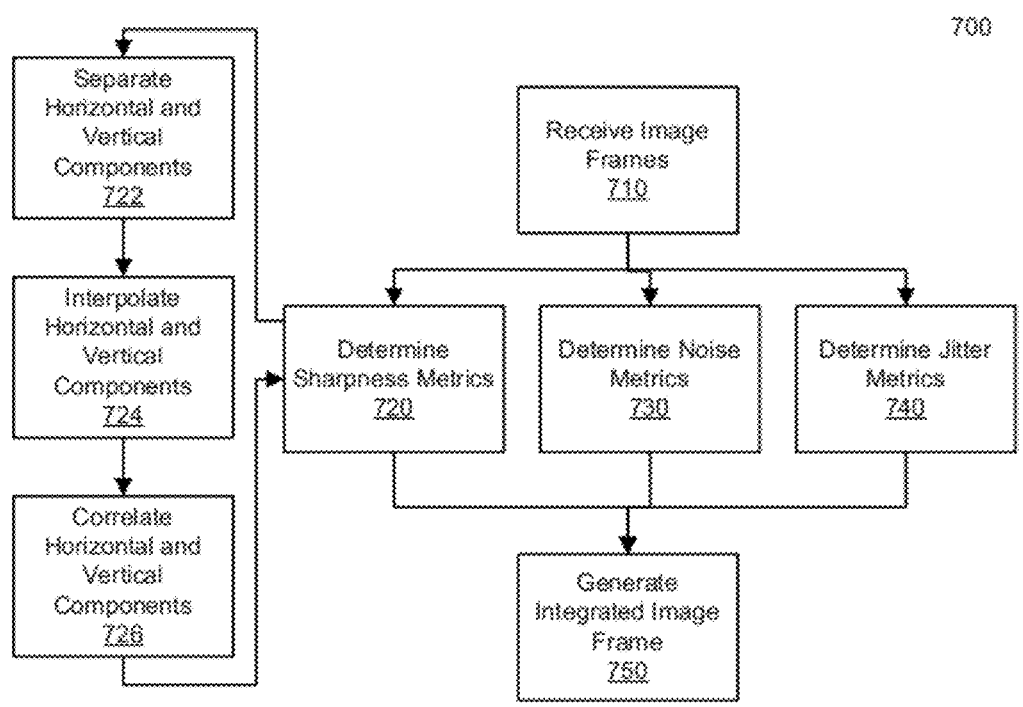
FIG. 7 is a flowchart of another exemplary image integration process.

FIG. 7 is a flowchart of another exemplary image integration process 700 utilizing, for example, the image system 310 of FIG. 3. The communication module 311 receives (710) a plurality of image frames (e.g., from a single camera platform, from a plurality of camera platforms, etc.). The image sharpness module 312 determines (720) a sharpness metric for each received image frame. The image sharpness module 312 separates (722) one or more horizontal edge components and one or more vertical edge components for each received image frame. The image sharpness module 312 interpolates (724) the one or more horizontal components and the one or more vertical components for each received image frame. The image sharpness module 312 correlates (726) the interpolated horizontal and vertical components to determine a pixel shift for each received image frame. The pixel shift is indicative of at least one of the edge content and the edge size of the respective image frame.

The image noise module 313 determines (730) a noise metric for each received image frame. The image jitter module 314 determines (740) a jitter metric for each received image frame in the plurality of image frames. The image integration module 315 generate (750) an integrated image frame from one or more of the plurality of image frames based on the sharpness metric, the noise metric, and the jitter metric.

In some examples, the image sharpness module 312 correlates (726) the interpolated horizontal and vertical components to determine a pixel shift for each received image frame via magnitude processing, summation of an absolute value, summation of zero crossings, summation of squares, and/or any other type of pixel processing technique. In other examples, the image sharpness module 312 generates an edge map of each received image frame based on the correlated horizontal and vertical components.

Figure 8:
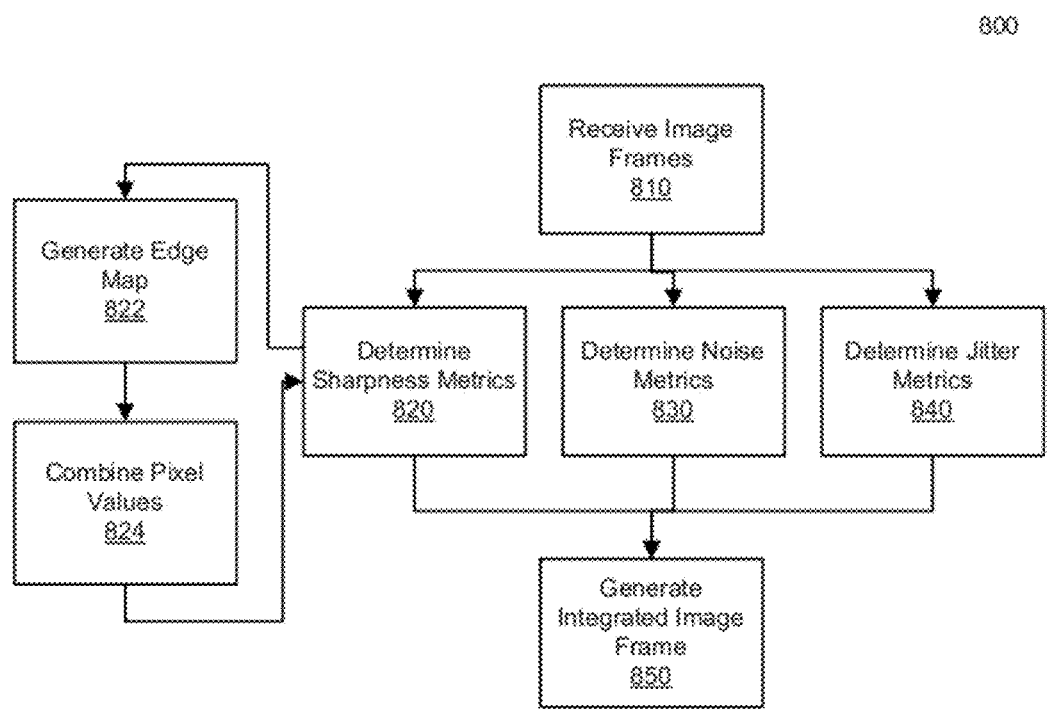
FIG. 8 is a flowchart of another exemplary image integration process.

FIG. 8 is a flowchart of another exemplary image integration process 800 utilizing, for example, the image system 310 of FIG. 3. The communication module 311 receives (810) a plurality of image frames (e.g., from a single camera platform, from a plurality of camera platforms, etc.). The image sharpness module 312 determines (820) a sharpness metric for each received image frame. The image sharpness module 312 generates (822) an edge map for each received image frame. The edge map includes pixel values indicative of an edge (e.g., 1, 10, etc.) and a non-edge (e.g., 0, −1, etc.). The image sharpness module 312 combines (824) the pixel values in the edge map for each received image frame to form the sharpness metric.

The image noise module 313 determines (830) a noise metric for each received image frame. The image jitter module 314 determines (840) a jitter metric for each received image frame in the plurality of image frames. The image integration module 315 generate (850) an integrated image frame from one or more of the plurality of image frames based on the sharpness metric, the noise metric, and the jitter metric.

In some examples, the image sharpness module 312 combines (824) the pixel values in the edge map by summation of the pixel values in the edge map for each received image frame. In other examples, image sharpness module 312 combines (824) the pixel values in the edge map by averaging the pixel values in the edge map for each received image frame.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A system for integrating image frames, the system comprising:
   one or more processors;
   a memory;
   an image sharpness module configured to determine, using the one or more processors, a sharpness metric for each image frame in a plurality of image frames, the sharpness metric being indicative of at least one of edge content and an edge size of the image frame;
   an image noise module configured to determine, using the one or more processors, a noise metric for each image frame in the plurality of image frames, the noise metric being indicative of a variation in brightness or color in the image frame;
   an image jitter module configured to determine, using the one or more processors, a jitter metric for each image frame in the plurality of image frames, the jitter metric being indicative of spatial shifts between the image frame and other image frames in the plurality of image frames; and
   an image integration module configured to generate, using the one or more processors, an integrated image frame from more than one of the plurality of image frames, by prioritizing or selecting the more than one of the plurality of image frames based on the sharpness metric, the noise metric, and the jitter metric.

2. The system of claim 1, wherein the image sharpness module is further configured to:
   separate one or more horizontal edge components and one or more vertical edge components in each image frame in the plurality of image frames;
   interpolate the one or more horizontal edge components and the one or more vertical edge components for each image frame in the plurality of image frames; and
   correlate the interpolated horizontal and vertical edge components to determine a pixel shift for each image frame in the plurality of image frames, the pixel shift being indicative of at least one of the edge content and the edge size of the respective image frame.

3. The system of claim 1, wherein the image sharpness module is further configured to:
   generate an edge map for each image frame in the plurality of image frames, the edge map comprises pixel values indicative of an edge and a non-edge; and
   combine the pixel values in the edge map for each image frame in the plurality of image frames to form the sharpness metric.

4. A method for integrating image frames, the method comprising:
   determining a sharpness metric for each image frame in a plurality of image frames, the sharpness metric being indicative of at least one of edge content and an edge size of the image frame;
   determining a noise metric for each image frame in the plurality of image frames, the noise metric being indicative of a variation in brightness or color in the image frame;
   determining a jitter metric for each image frame in the plurality of image frames, the jitter metric being indicative of spatial shifts between the image frame and other image frames in the plurality of image frames; and
   generating an integrated image frame from more than one of the plurality of image frames, by prioritizing or selecting the more than one of the plurality of image frames based on the sharpness metric, the noise metric, and the jitter metric.

5. The method of claim 4, wherein determining the sharpness metric further comprises:
separating one or more horizontal edge components and one or more vertical edge components in each image frame in the plurality of image frames;
interpolating the one or more horizontal edge components and the one or more vertical edge components for each image frame in the plurality of image frames; and
correlating the interpolated horizontal and vertical edge components to determine a pixel shift for each image frame in the plurality of image frames, the pixel shift being indicative of at least one of the edge content and the edge size of the respective image frame.

6. The method of claim 4, wherein determining the sharpness metric further comprises:
generating an edge map for each image frame in the plurality of image frames, the edge map comprises pixel values indicative of an edge and a non-edge; and
combining the pixel values in the edge map for each image frame in the plurality of image frames to form the sharpness metric.

7. The method of claim 6, wherein combining the pixel values in the edge map comprises summing the pixel values in the edge map for each image frame in the plurality of image frames to form the sharpness metric.

8. A computer program product, tangibly embodied in a machine-readable storage device, the computer program product including instructions being operable to cause a data processing apparatus to:
determine a sharpness metric for each image frame in a plurality of image frames, the sharpness metric being indicative of at least one of edge content and an edge size of the image frame;
determine a noise metric for each image frame in the plurality of image frames, the noise metric being indicative of a variation in brightness or color in the image frame;
determine a jitter metric for each image frame in the plurality of image frames, the jitter metric being indicative of spatial shifts between the image frame and other image frames in the plurality of image frames; and
generate an integrated image frame from more than one of the plurality of image frames, by prioritizing or selecting the more than one of the plurality of image frames based on the sharpness metric, the noise metric, and the jitter metric.

* * * * *